United States Patent
Takada

(10) Patent No.: US 6,636,537 B2
(45) Date of Patent: Oct. 21, 2003

(54) LASER APPARATUS

(75) Inventor: Yasutoshi Takada, Gamagori (JP)

(73) Assignee: Nidek Co., Ltd., Gamagori (JP)

( * ) Notice: Subject to any disclaimer, the term of this patent is extended or adjusted under 35 U.S.C. 154(b) by 0 days.

(21) Appl. No.: 09/938,564

(22) Filed: Aug. 27, 2001

(65) Prior Publication Data

US 2002/0027932 A1 Mar. 7, 2002

(30) Foreign Application Priority Data

Sep. 1, 2000 (JP) ........................................ 2000-269883
Aug. 20, 2001 (JP) ........................................ 2001-248714

(51) Int. Cl.[7] .......................... H01S 3/10; H01S 3/081; H01S 3/082
(52) U.S. Cl. .............................. 372/23; 372/20; 372/21; 372/22; 372/93; 372/97
(58) Field of Search .............................. 372/23, 18, 19, 372/20, 93, 97, 98, 107, 108, 21, 22

(56) References Cited

U.S. PATENT DOCUMENTS

| 4,425,648 A | 1/1984 | Holly |
| 5,144,630 A | 9/1992 | Lin |
| 5,249,192 A | 9/1993 | Kuizenga et al. |
| 5,345,457 A | 9/1994 | Zenzie et al. |
| 5,528,612 A | 6/1996 | Scheps et al. |

FOREIGN PATENT DOCUMENTS

| EP | 0 526 006 A2 | 2/1993 | |
| JP | A 10-65238 | 3/1998 | |
| JP | 053368 | * 2/2001 | ............ H01S/3/108 |
| JP | A 2001-53368 | 2/2001 | |
| JP | A 2001-53369 | 2/2001 | |

* cited by examiner

*Primary Examiner*—Paul Ip
*Assistant Examiner*—Armando Rodriguez
(74) *Attorney, Agent, or Firm*—Oliff & Berridge, PLC

(57) ABSTRACT

A laser apparatus capable of emitting laser beams of a plurality of different wavelengths is disclosed. This apparatus includes an exciting light source, a solid-state laser medium which emits light of a plurality of peak wavelengths by light from the exciting light source, a first resonance optical system including a first and second resonant mirrors placed with the laser medium sandwiched between them to resonate light of a first peak wavelength among the a plurality of peak wavelengths emitted from the laser medium and a first wavelength converting element located between the laser medium and the second mirror to oscillate second harmonic light of the first peak wavelength light as a first laser beam, a movable reflection mirror disposed changeably between a first and second positions with respect to an optical path between the laser medium and the first wavelength converting element so that, when the reflection mirror is disposed in the first position, it constitutes the first resonance optical system, and a second resonance optical system including a third resonant mirror which resonates light of a second peak wavelength emitted from the laser medium in cooperation with the first mirror via the movable mirror disposed in the second position, the light of the second peak wavelength being different in wavelength from the first peak wavelength and a second wavelength converting element located between the third mirror and the movable mirror disposed in the second position to oscillate second harmonic light of the second peak wavelength light as a second laser beam.

13 Claims, 6 Drawing Sheets

LASER APPARATUS

BACKGROUND OF THE INVENTION

1. Field of the Invention

The present invention relates to a laser apparatus capable of emitting laser beams of a plurality of different wavelengths.

2. Description of Related Art

As a laser apparatus capable of emitting laser beams of a plurality of different wavelengths, there have been known apparatuses using an argon dye laser capable of changing wavelengths of laser beams to be emitted, a krypton laser capable of emitting laser beams of multiple wavelengths, or others. Those lasers have been used in various fields including a medical field; for example, in ophthalmic surgical operations using laser beams of different wavelengths according to affected parts or treatment purposes. For instance, in the ophthalmic surgical operations, treatments on different diseases (affected parts) are performed by using laser beams having wavelengths (colors) centered in the visible region. In some disease cases, the laser beams of different wavelengths, for example, red, green, and other color beams, are irradiated simultaneously or selectively. It is therefore convenient if a single apparatus can emit laser beams of a plurality of different wavelengths.

The aforementioned laser apparatus capable of changing wavelengths of laser beams is concretely an apparatus using a gas laser or a dye laser. These lasers have many problems in a short life of a laser tube, a need for a large amount of electric power, an increased size of the apparatus, etc. Instead thereof, therefore, a laser apparatus capable of emitting (oscillating) laser beams of multiple wavelengths with use of a solid-state laser has been studied. Under those circumstances, as disclosed in Japanese patent unexamined publication No. 10-65238, there has been proposed a method of emitting laser beams of plural various wavelengths by changing output mirrors also used as resonant mirrors on a resonation optical axis.

In relation to the method of changing the output mirrors also serving as resonant mirrors, the apparatus which generates laser beams of multiple wavelengths by oscillating second harmonic light requires replacement of nonlinear crystals, output mirrors, and others used for producing the second harmonic light, increasing the number of optical components. This also causes the difficulty in ensuring the alignment accuracy of the individual optical components during resonance.

In other words, the resonant mirror usually has a curved portion. If angle deviation of the mirror is caused by the replacement, the output efficiency of a laser beam is deteriorated (the output power is reduced). If angle deviation of the nonlinear crystal is caused by the replacement, the output efficiency is similarly deteriorated. In addition, the nonlinear crystal needs to be controlled in relation to the temperature, so that a temperature control unit such as a Peltier element or the like has to be moved together with the nonlinear crystal.

SUMMARY OF THE INVENTION

The present invention has been made in view of the above circumstances and has an object to overcome the above problems and to provide a laser apparatus capable of efficiently emitting laser beams of plural various wavelengths while easily ensuring the accuracy of alignment of the optical component in changing the wavelengths of laser beams.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a laser apparatus capable of emitting laser beams of a plurality of different wavelengths, the apparatus including: an exciting light source; a solid-state laser medium which emits light of a plurality of peak wavelengths by light from the exciting light source; a first resonance optical system including a first resonant mirror and a second resonant mirror placed with the laser medium sandwiched between them to resonate light of a first peak wavelength among the plurality of peak wavelengths emitted from the laser medium, and a first wavelength converting element located between the laser medium and the second mirror to oscillate second harmonic light of the first peak wavelength light as a first laser beam; a movable reflection mirror disposed changeably between a first position and a second position with respect to an optical path between the laser medium and the first wavelength converting element so that, when the reflection mirror is disposed in the first position, it constitutes the first resonance optical system; and a second resonance optical system including a third resonant mirror which resonates light of a second peak wavelength emitted from the laser medium in cooperation with the first mirror via the movable mirror disposed in the second position, the light of the second peak wavelength being different in wavelength from the first peak wavelength, and a second wavelength converting element located between the third mirror and the movable mirror disposed in the second position to oscillate second harmonic light of the second peak wavelength light as a second laser beam.

According to another aspect of the present invention, there is provided a laser apparatus capable of emitting laser beams of a plurality of different wavelengths, the apparatus including: an exciting light source; a solid-state laser medium which emits light of a plurality of peak wavelengths by light from the exciting light source; a first resonance optical system including a first resonant mirror and a second resonant mirror placed with the laser medium sandwiched between them to resonate light of a first peak wavelength among the plurality of peak wavelengths emitted from the laser medium and a first wavelength converting element located between the laser medium and the second mirror to oscillate second harmonic light of the first peak wavelength light as a first laser beam; a movable reflection mirror movable onto/off from an optical path between the laser medium and the first wavelength converting element; and a second resonance optical system including a third resonant mirror which resonates light of a second peak wavelength emitted from the laser medium in cooperation with the first mirror via the movable mirror moved onto the optical path, the light of the second peak wavelength being different in wavelength from the first peak wavelength, and a second wavelength converting element located between the third mirror and the movable mirror moved onto the optical path to oscillate second harmonic light of the second peak wavelength light as a second laser beam.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
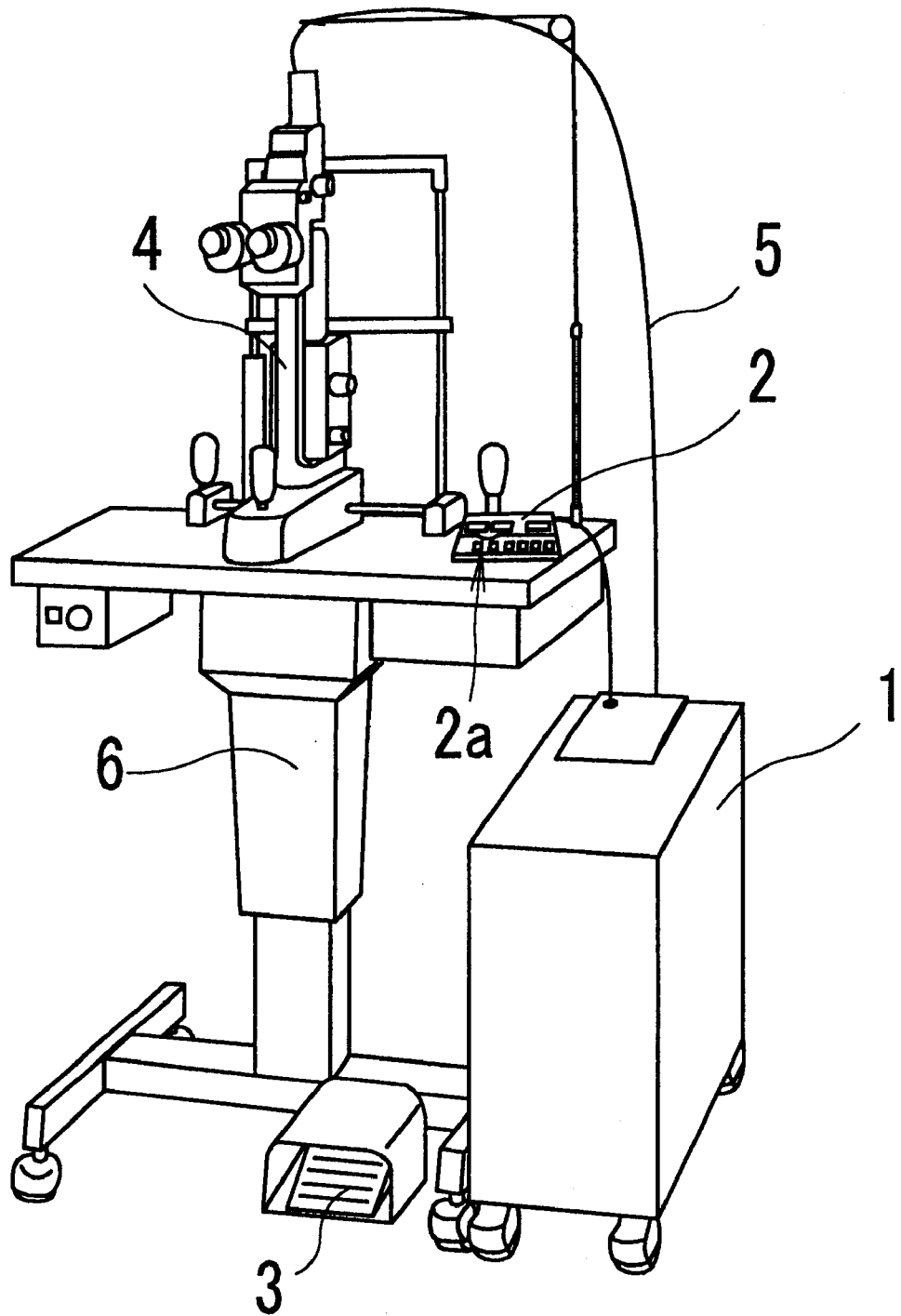
FIG. 1 is a perspective view of an ophthalmic laser photocoagulation apparatus in an embodiment according to the present invention.
Figure 2:
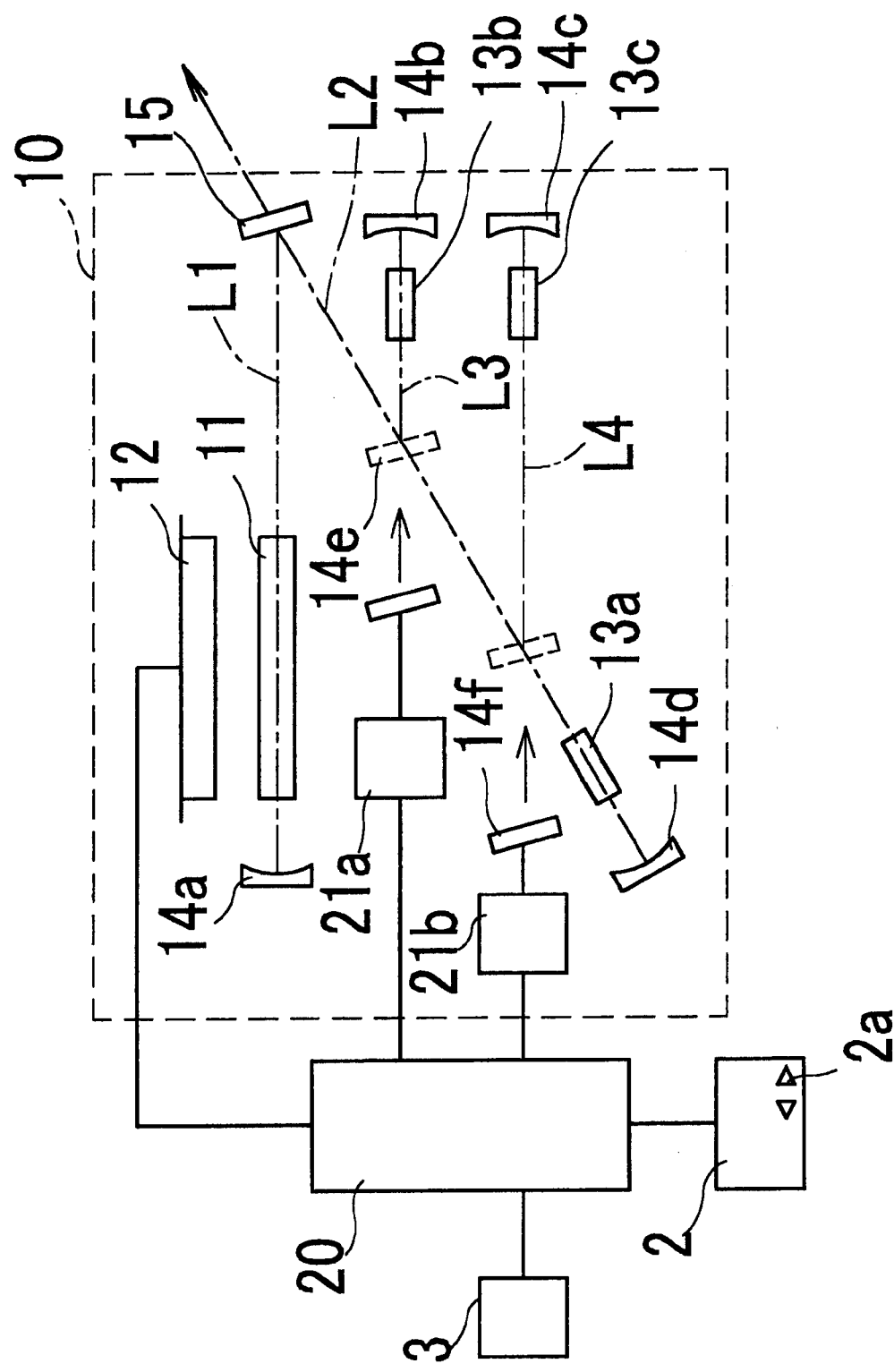
FIG. 2 is a schematic diagram of an optical system and a control system in the apparatus in the present embodiment.

A detailed description of a preferred embodiment of a laser apparatus embodying the present invention will now be given referring to the accompanying drawings. FIG. 1 is a perspective view of an ophthalmic photocoagulation laser apparatus using a slit lamp. FIG. 2 is a schematic diagram of an optical system and a control system in the apparatus.

Numeral 1 is a main body of the apparatus, which houses a laser oscillator 10, a part of a light delivery optical system for delivering a laser beam from the laser oscillator 10 to an affected part of a patient's eye to irradiate the affected part, a control section 20, and others. Numeral 2 is a control board of the apparatus, which is provided thereon with a wavelength selection switch 2a used for selecting a wavelength of a laser beam and other various switches for setting laser irradiation conditions. Numeral 3 is a footswitch for generating a trigger signal to start laser irradiation.

Numeral 4 is a slit lamp containing an observation optical system for allowing an operator to observe the patient's eye and a part of the light delivery optical system. Numeral 5 is a fiber through which the laser beam is delivered from the main body 1 to the slit lamp. Numeral 6 is a stand which mounts thereon the slit lamp 4 movably in a vertical direction.

Numeral 10 is a laser oscillator internally provided with an Nd:YAG crystal 11 (hereinafter, referred to as "rod") which is a solid-state laser medium, a laser diode 12 (hereinafter, referred to as "LD") serving as an exciting light source, nonlinear crystals 13a, 13b, and 13c (hereinafter, referred to as "NLC") serving as wavelength converters (wavelength converting elements), total reflection mirrors (high reflectors) 14a to 14f (hereinafter, referred to as "HR"), and an output mirror 15. It is to be noted that the nonlinear crystals may be selected from among KTP crystal, LBO crystal, BBO crystal, or the like. In the present embodiment, the KTP crystal is used.

The Nd:YAG crystal emits light having a plurality of oscillation lines (peak wavelengths) in the near-infrared region by an exciting light from the exciting light source. Therefore, the apparatus in the present embodiment is constructed such that each second harmonic light of three oscillation lines; about 1064 nm, about 1123 nm, about 1319 nm, which are the wavelengths with high power among the plural oscillation lines emitted from the above crystal, is generated with the use of the nonlinear crystal, thereby emitting (oscillating) the laser beams of three colors with wavelengths of about 532 nm (green), about 561 nm (yellow), and about 659 nm (red), respectively.

On the optical path of an optical axis L1 on which the rod 11 is placed, an HR 14a is disposed at one end thereof, and the output mirror 15 is arranged at a predetermined inclination angle at the other end. The HR 14a in the present embodiment has the property of totally reflecting the light of wavelengths of 1064 to 1319 nm. Besides the HR 14a, another reflector may be used if only it can widely reflect the light of wavelengths in the near-infrared region including 1064 nm, 1123 nm, and 1319 nm. The output mirror 15 has the property of totally reflecting the light of wavelengths of 1064 to 1319 nm, while transmitting the light of wavelengths of 532 to 659 nm.

On an optical axis L2 in a reflecting direction of the output mirror 15, an NLC 13a and an HR 14d are fixedly provided. The NLC 13a is placed so as to generate the light of 659 nm which is the second harmonic light from the light of 1319 nm, or equivalently, to convert the light of 1319 nm to the second harmonic light, namely, the light of 659 nm. The HR 14d has the property of totally reflecting the light of 1319 nm and the light of 659 nm. In other words, the HR 14d used for oscillating the laser beam of 659 nm is desired to have the property of totally reflecting the light of 659 nm and also the light of 1319 nm among the oscillation lines emitted from the Nd:YAG crystal and having high reflection losses with respect to the light of wavelengths with a higher gain than the above wavelengths.

The above optical arrangement constitutes the first resonance optical system including a resonator configuration in which the HR 14a on the optical axis L1 and the HR 14d on the optical axis L2 are arranged in a pair with the rod 11 sandwiched between them. Thus, the light of 659 nm generated by the NLC 13a can be emitted through the output mirror 15 without being blocked by the rod 11.

An HR 14e is disposed to be movable onto/off from the optical axis L2 between the output mirror 15 and the NLC 13a. This HR 14e has the property of totally reflecting the light of 1064 nm and the light of 532 nm. On the optical axis L3 in a reflecting direction of the HR 14e, an NLC 13b and an HR 14b are fixedly provided. The NLC 13b is disposed so as to generate the light of 532 nm which is the second harmonic light from the light of 1064 nm. The HR 14b has, as with the HR 14e, the property of totally reflecting the light of 1064 nm and that of 532 nm. More specifically, the HR 14b (14e) for oscillating the laser beam of 532 nm is desired to have the property of totally reflecting at least the light of 532 nm and the light of 1064 nm.

In the above optical arrangement, when the HR 14e is moved onto the optical axis L2, the HR 14a, the rod 11, and the output mirror 15 of the first resonance optical system also serve to construct the second resonance optical system in which the HR 14a and the HR 14b constitute a resonator in a pair with the rod 11 sandwiched between them.

An HR 14f is disposed to be movable onto/off from the optical axis L2 between the NLC 13a and the position where the HR 14e is to be moved onto or off from. This HR 14f has the property of totally reflecting the light of 1123 nm and that of 561 nm. On the optical axis L4 in a reflecting direction of the HR 14f, there are fixedly arranged an NLC 13c and an HR 14c. This NCL 13c is disposed so as to generate the light of 561 nm which is the second harmonic light from the light of 1123 nm. As with the HR 14f, the HR 14c has the property of totally reflecting the light of 1123 nm and the light of 561 nm. To be more specific, the HR 14c (HR 14f) for oscillating the laser beam of 561 nm is desired to have the property of totally reflecting the light of 561 nm and the light of 1123 nm among the oscillation lines from the Nd:YAG crystal and having high reflection losses with respect to the light of wavelengths with a higher gain than the above wavelengths.

In the above optical arrangement, when the HR 14f is moved onto the optical axis L2, the HR 14a, the rod 11, and the output mirror 15 of the first resonance optical system also serve to construct the third resonance optical system in which the HR 14a and the HR 14c constitute a resonator in a pair with the rod 11 sandwiched between them.

Numeral 20 is a control section which controls each part of the apparatus based on signals from the control board 2 and the footswitch 3. Numerals 21a and 21b are driving devices such as motors and others. The driving device 21a is operated to move the HR 14e onto/from the optical axis L2. The other driving device 21b is operated to move the HR 14f onto/from the optical axis L2.

In the apparatus having the above structure, the changing of the resonance optical systems including the resonator configurations may be simply made by insertion/removal of the HR 14e or the HR 14f without needing movements of other optical components. Thus, alignment deviation caused by movements of the optical components can be reduced to a minimum. More specifically, the apparatus has no need for moving the resonant mirrors and the nonlinear crystals which are susceptible to the alignment deviation. The above structure can have high flexibility in design of the length of each resonator (the distance between the resonant mirrors), so that an appropriate optical system arrangement (the length of each resonator) whereby efficient oscillation is enabled can be easily determined resonator by resonator.

It is to be noted that the insertion/removal of the HRs 14e and 14f by the driving devices 21a and 21b respectively is shown in FIG. 2 as the movements in the directions of the optical axes L3 and L4. However, these movements are preferably made in a direction perpendicular to the drawing paper of FIG. 2. In this case, alignment accuracy can be ensured without being influenced by the positional accuracy resulting from the movements of HRs 14e and 14f.

Next, explanation is made on methods of emitting laser beams of a plurality of different wavelengths by means of the above structures.

[A Method of Emitting a Laser Beam of 659 nm]

An operator operates the switch 2a to select "red" (659 nm) as the color (wavelength) of a laser beam to be used in a surgical operation. When the red is selected, the HRs 14e and 14f are held out of the optical axis L2.

Upon receipt of a trigger signal from the footswitch 3, the control section 20 applies electric current to the LD 12 to thereby excite the rod 11. It is to be noted that both end faces of an Nd:YAG crystal used as the rod 11 are applied with an AR (anti reflective) coating for enhancing transmittance with respect to each of the light beams of 1064 nm, 1123 nm, and 1319 nm.

When the rod 11 is excited, the light of 1319 nm is resonated between the HRs 14a and 14d and converted to the second harmonic thereof; the light of 659 nm by the NLC 13a disposed on the optical axis L2. The thus produced laser beam of 659 nm is allowed to pass through the output mirror 15 and enter the fiber 5. Then, the laser beam delivered into the slit lamp 4 through the fiber 5 is irradiated from an irradiation port of the slit lamp 4 toward the patient's eye.

[A Method of Emitting a Laser Beam of 532 nm]

Figure 3:
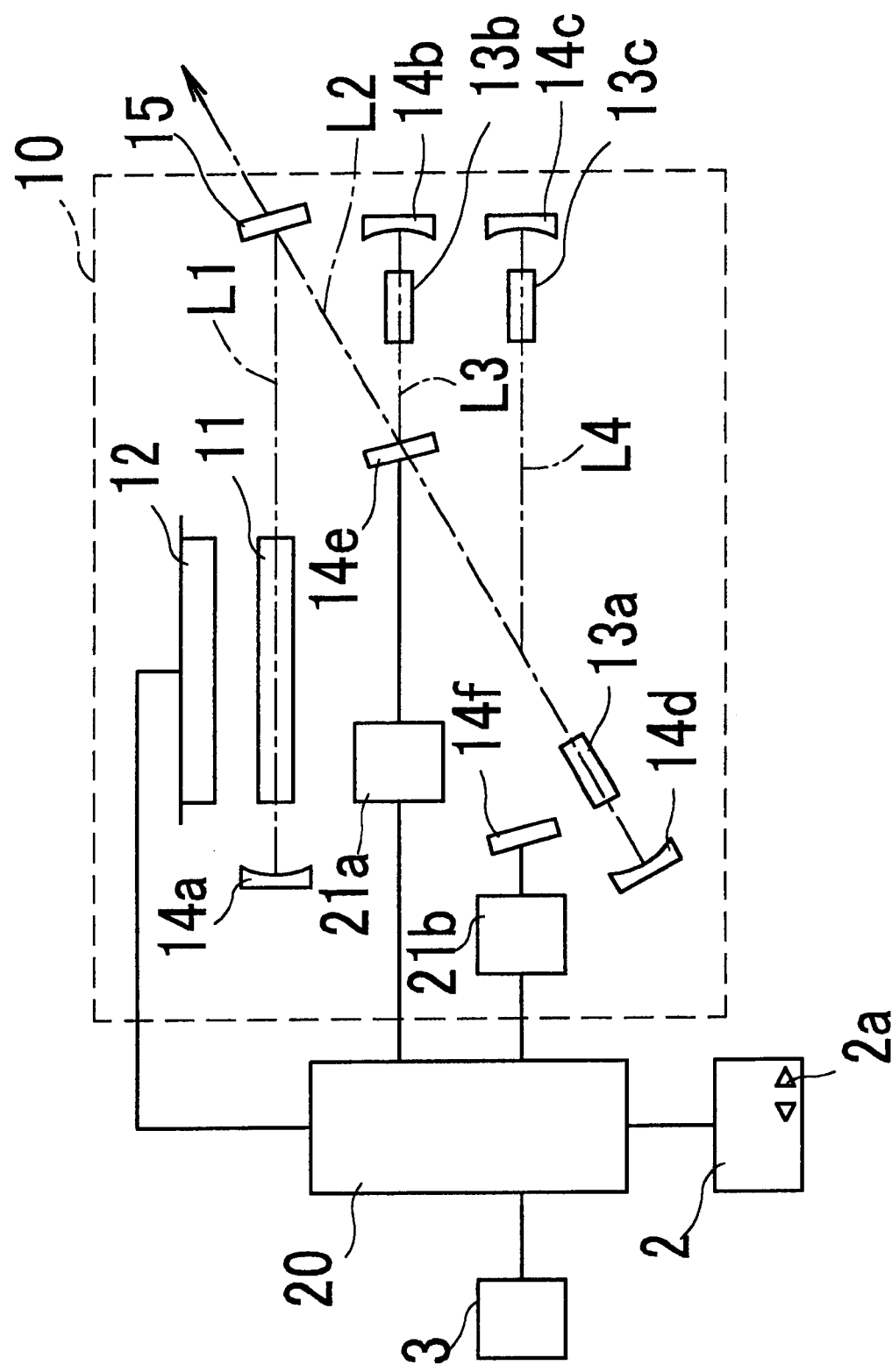
FIG. 3 is a schematic diagram of the optical system in which the position of a total reflection mirror is changed for emission of a laser beam of a different wavelength from that in FIG. 2.

An operator operates the switch 2a to select "green" (532 nm) as the color (wavelength) of a laser beam to be used in a surgical operation. The control section 20 drives the driving device 21a to move the HR 14e onto the optical axis L2 (see FIG. 3). Upon receipt of a trigger signal from the footswitch 3, the control section 20 applies electric current to the LD 12 to thereby excite the rod 11.

When the rod 11 is excited, the light of 1064 nm is resonated between the HRs 14a and 14b and converted to the second harmonic thereof; the light of 532 nm by the NLC 13b disposed on the optical axis L3. The thus produced laser beam of 532 nm is allowed to pass through the output mirror 15 and enter the fiber 5. Then, the laser beam is irradiated from the irradiation port of the slit lamp 4 toward the patient's eye.

[A Method of Emitting a Laser Beam of 561 nm]

An operator operates the switch 2a to select "yellow" (561 nm) as the color (wavelength) of a laser beam to be used in a surgical operation. The control section 20 drives the driving device 21b to move the HR 14f onto the optical axis L2. If the laser beam of 532 nm was selected at the last emission time, the HR 14e is moved off from the optical axis L2 at this time. The control section 20 then applies electric current to the LD 12 in response to a trigger signal from the footswitch 3, thereby exciting the rod 11.

When the rod 11 is excited, the light of 1123 nm is resonated between the HRs 14a and 14c and converted to the second harmonic thereof; the light of 561 nm by the NLC 13c disposed on the optical axis L4. The thus produced laser beam of 561 nm is allowed to pass through the output mirror 15 and enter the fiber 5. Then, the laser beam is irradiated from the irradiation port of the slit lamp 4 toward the patient's eye.

According to the above methods, the laser beams of different wavelengths; 659 nm (red), 532 nm (green), and 561 nm (yellow) can be obtained. In the present embodiment, the reflection property of the HR 14d for oscillating the laser beam of 659 nm is desired to include the reflection rate of 50% or less with respect to the light of the oscillation lines with short-wavelengths of 1123 nm or less which provide a higher gain than 1319 nm among the oscillation lines emitted from the Nd:YAG crystal, and the reflection rate of 20% or less with respect to the light of 1064 nm.

Figure 4:
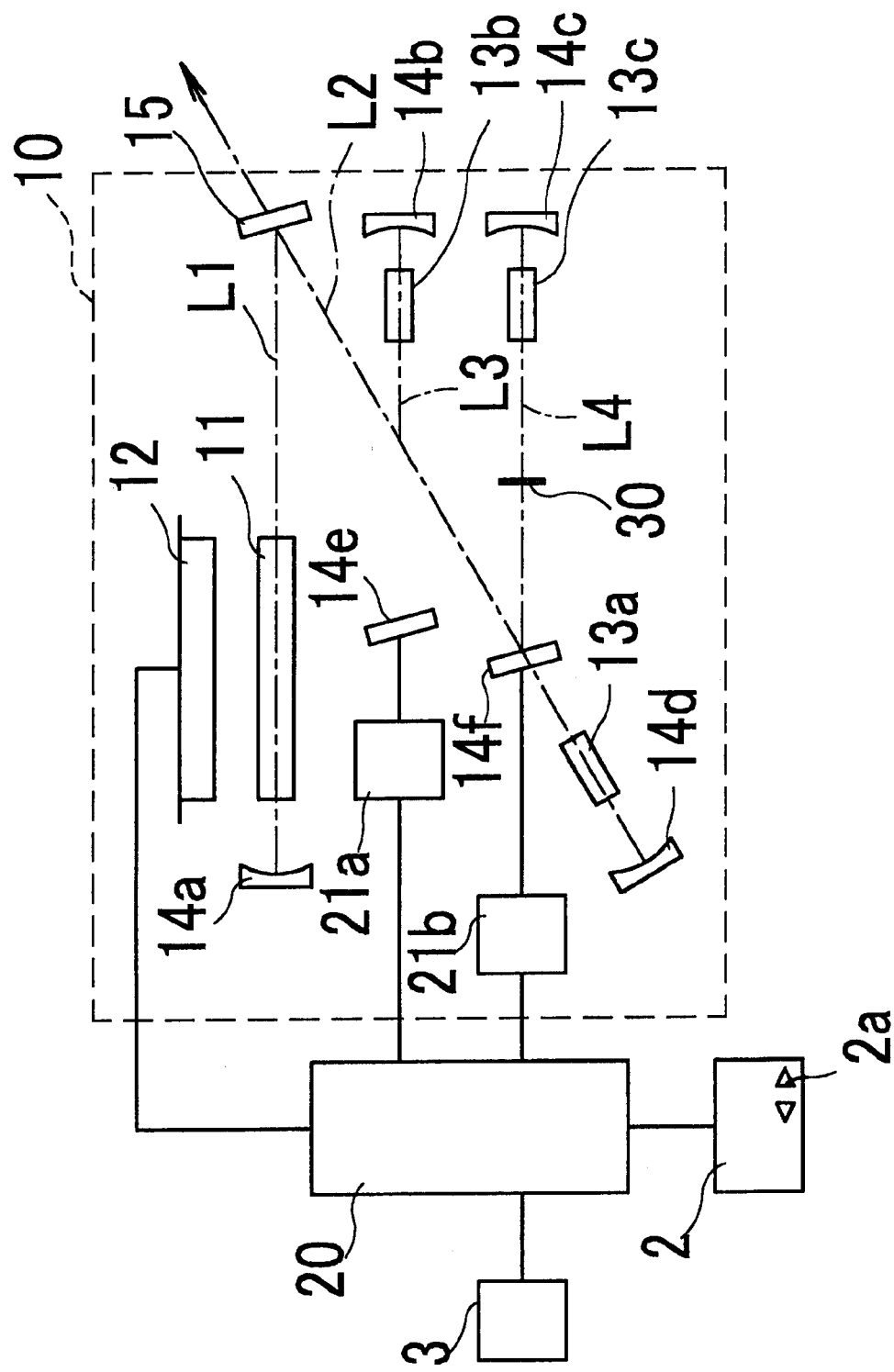
FIG. 4 is a schematic diagram of the optical system in which the position of another total reflection mirror is changed for emission of a laser beam of another different wavelength.

As in the above case, the reflection property of the HR 14c (HR 14f) for oscillating the laser beam of 561 nm is desired to include the reflection rate of 50% or less with respect to the light of the oscillation lines with short-wavelengths of 1115.9 nm or less which provide a higher gain than 1123 nm among the oscillation lines emitted from the Nd:YAG crystal, and the reflection rate of 20% or less with respect to the light of 1064 nm. It is to be noted that the light of 1115.9 nm among the oscillation lines from the Nd:YAG crystal is close in wavelength to the light of 1123 nm. It therefore may be difficult to provide the reflection property of the HR 14c with a difference in reflection rate between those close wavelengths. In this case, a wavelength selectable element 30 such as an etalon is disposed between the NLC 13c and the HR 14f as shown in FIG. 4, thereby selectively taking out the light of 1123 nm.

In the above embodiment, the second and third resonance optical systems are constructed by inserting the total reflection mirrors (HRS 14e and 14f) onto the optical path of the first resonance optical system. Instead thereof, modifications shown in FIGS. 5 and 6 may be adopted.

Figure 5:
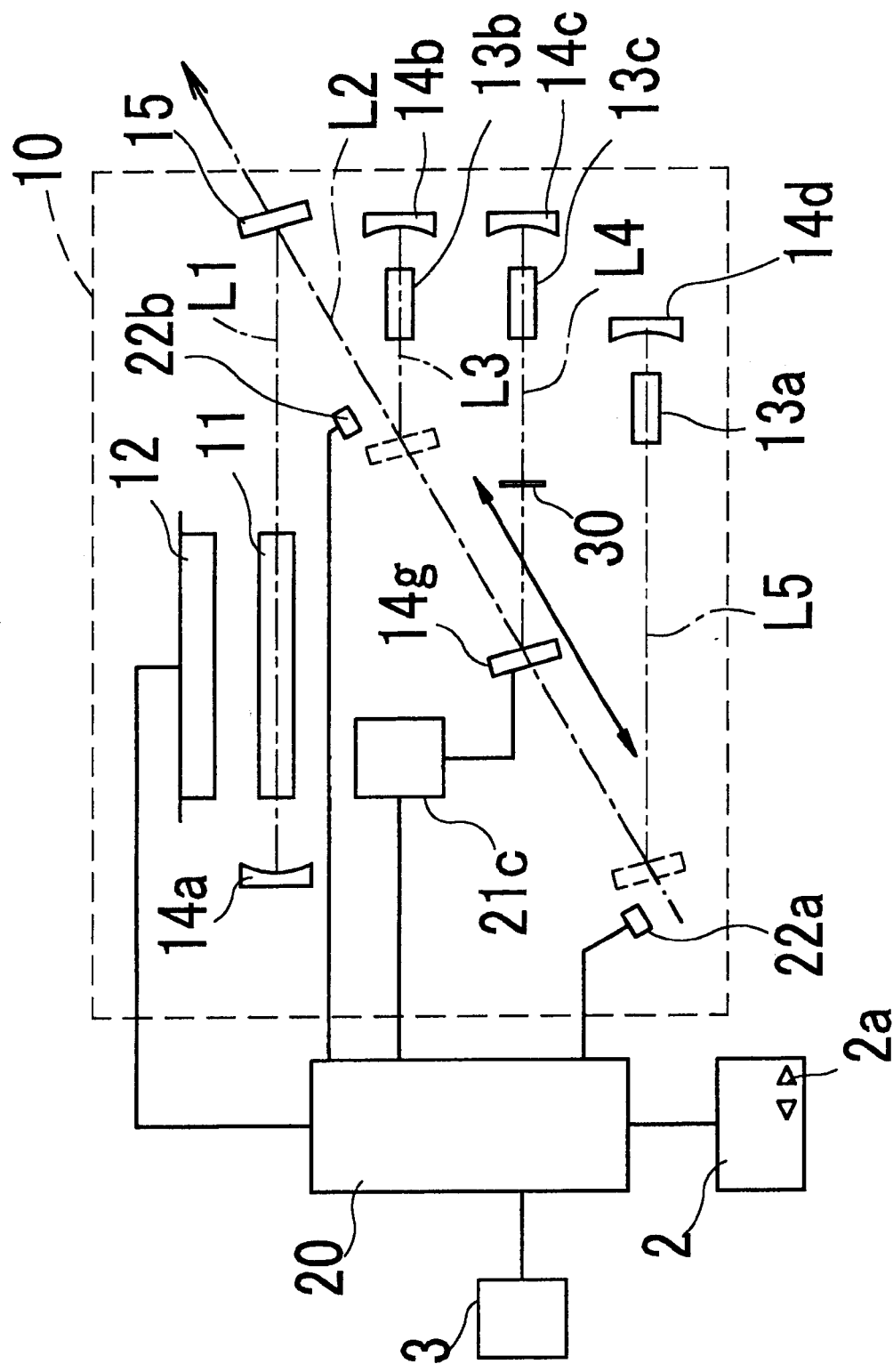
FIG. 5 is a schematic diagram of a modification in the optical system and the control system of FIG. 2.

At first, a modification shown in FIG. 5 is explained. The elements indicated by like numerals corresponding to those of FIGS. 1 and 4 have the same functions and their explanations are omitted.

Numeral 14g is a total reflection mirror (HR) having the same property as the HR 14a, and it is disposed on the axis L2 at a predetermined angle. This HR 14g is structured to be movable on the axis L2 by means of a driving device 21c constituted of driving means (for example, a pulse motor or the like) capable of detecting a driving amount. The HR 14g is moved so that its reflecting surface is positioned at each intersection point of the axis L2 with respect to the axes L3, L4, and L5 respectively in order to constitute the resonance optical systems for emitting laser beams of different wavelengths. To be more specific, when the reflecting surface of the HR 14g is disposed at the intersection point of the axes L2 and L5, the HRs 14a and 14d form a pair of resonant mirrors sandwiching the rod 11 between them, constituting a resonance optical system which can produce a laser beam of 659 nm. When the reflecting surface of the HR 14g is positioned at the intersection point of the axes L2 and L4, a resonance optical system which can produce a laser beam of 561 nm is constituted. When the reflecting surface of the HR 14g is positioned at the intersection point of the axes L2 and L3, alternatively, a resonance optical system which can produce a laser beam of 532 nm is constructed. In the above cases, the optical paths of the axes L3, L4, and L5, each corresponding to a reflecting direction of the axis L2 via the HR 14g, form individual resonance optical paths of the above resonance optical systems.

In the optical system shown in FIG. 5, the axes L3, L4, and L5 are designed (disposed) in parallel to one another. Thus, with the use of the HR 14g, the resonators for laser beams of different wavelengths can be set by simply moving the HR 14g on the axis L2 without the need for changing the angular position of the HR 14g. Consequently, alignment accuracy can be easily ensured if only the movement of the HR 14g on the axis is carefully performed.

It is to be noted that numerals 22a and 22b are limit sensors for detecting the limits of movements of the HR 14g and determining the position serving as the reference of the movements. When the position of HR 14g is drivingly controlled to constitute the resonators, the control section 20 first causes the driving device 21c, at power-on of the apparatus, to move the HR 14g to the position where it is detected by the limit sensor 22a (or 22b). The HR 14g is then moved by the predetermined driving amount from the first position serving as the reference position to another position where the laser beam of a selected wavelength can be output (the intersection point of the axis L2 and the axis L3, L4, or L5).

To further enhance the emission efficiency of the laser beam, a sensor not shown provided at an output side of the output mirror 15 is used in the following manner. After the HR 14g is moved to the position where the laser beam of the selected wavelength is to be output as described above, the sensor detects the output power of the laser beam and then the HR 14g is caused to slightly move along the axis L2 to adjust its position so that the highest output power of the laser beam is detected. This makes it possible to more efficiently perform the emission of the laser beam. It is to be noted that a sensor conventionally provided in the laser apparatus for detecting the output power of the apparatus may be utilized as the sensor for detecting the output power of the laser beam.

Figure 6:
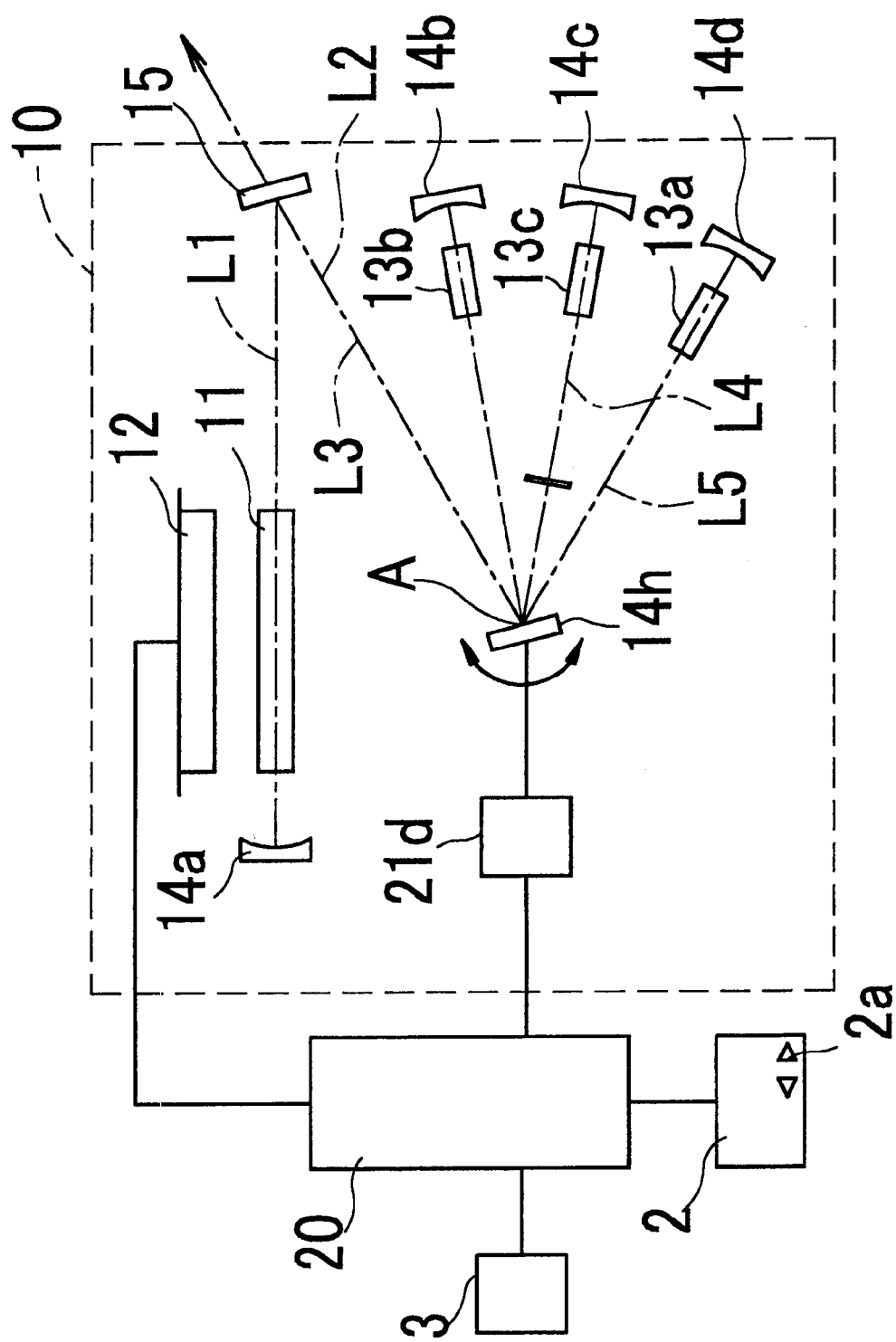
FIG. 6 is a schematic diagram of another modification in the optical system and the control system of FIG. 2.

FIG. 6 shows another modification, illustrating an optical system in which a single total reflection mirror is made to change its angular position to thereby emit laser beams of three different wavelengths. The elements indicated by like numerals as in the above embodiment have the same functions and their explanations are omitted.

Numeral 14h is a total reflection mirror (HR) having the same reflection property as the HR 14a. Numeral 21d is a driving device constructed of driving means (for example, a pulse motor or the like) capable of detecting a driving amount. This driving device 21d can drivingly rotate the HR 14h about the axis perpendicular to the axis L2 (namely, about the axis passing a point A and perpendicular to the drawing paper). The driving amount of the driving device 21d is controlled by the control section 20. In FIG. 6, the axes L3, L4, and L5 are designed so as to intersect one another at the intersection point A on the axis L2. At this point A, the reflecting surface of the HR 14h is positioned. By the changing of the angular positions of the reflecting surface of the HR 14g, the optical paths of the axis L3, L4, and L5 corresponding to the reflecting directions of the reflecting surface at the respective positions form individual resonance optical paths of the resonance optical systems.

In the case of drivingly controlling the position of the HR 14h to constitute each of the resonance optical systems for emitting the laser beam of a corresponding wavelength, the control section 20 first causes the driving device 21d, at power-on of the apparatus, to return the HR 14h to a predetermined angular position. Thereafter, the HR 14h is drivingly rotated from the first position serving as the reference angular position to another angular position needed for emitting a laser beam of a selected wavelength. More specifically, when the angular position of the reflecting surface of the HR 14h is changed to make the reflecting direction of the axis L2 correspond to the axis L5, the HRs 14a and 14d constitute a resonator in a pair with the rod 11 and others sandwiched between them, thus constituting a resonance optical system which can produce a laser beam of 659 nm. When the reflecting direction of the axis L2 is made to correspond to the axis L4, a resonance optical system which can produce a laser beam of 561 nm is formed. Furthermore, when the reflecting direction of the axis L2 is made to correspond to the axis L3, a resonance optical system which can produce a laser beam of 532 nm is constructed. It is to be noted that adjusting the HR 14h to a predetermined angular position (the reference angular position) may be carried out by detecting the angular position of the HR 14h by means of the aforementioned limit sensors and the like.

Furthermore, to enhance the emission efficiency of the laser beam, the sensor for detecting the output power of the laser beam may be used as mentioned above to make fine adjustment of the HR 14h to the angular position at which the highest output power of the laser beam is detected.

The present invention may be embodied in other specific forms without departing from the spirit or essential characteristics thereof. For instance, the apparatus in the above embodiment is arranged to emit a laser beam of a wavelength selected from among three different wavelengths, but it is not limited thereto. The wavelength of the laser beam to be emitted can be selected from among multiple wavelengths, for example, two wavelengths, four wavelengths, and more. Each of the resonance optical systems constituted of the HRs 14a and 14b, the HRs 14a and 14c, and the HRS 14a and 14d, respectively, may be designed to have an appropriate length in optical arrangement for a corresponding wavelength.

As described above, according to the present invention, the number of the optical members which are moved to select wavelengths is kept to a minimum, which can prevent alignment deviation of those optical members. Furthermore, the length in optical arrangement between the resonators can be determined appropriately for a corresponding wavelength.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A laser apparatus for emitting laser beams of a plurality of different wavelengths, the apparatus including:
   an exciting light source;
   a solid-state laser medium which emits light of a plurality of peak wavelengths by the exciting light source;
   a movable reflection mirror disposed changeably between a first position and a second position;
   a first resonance optical system including:
      a first resonant mirror and a second resonant mirror placed with the laser medium, forming the first resonance optical system, and the movable mirror disposed in the first position interposed between the first resonant mirror and the second resonant mirror to resonate light of a first peak wavelength among the plurality of peak wavelengths emitted from the laser medium, the first position in which the first peak wavelength light being reflected by the movable mirror between the laser medium and the second mirror; and
      a first wavelength converting element located between the movable mirror disposed in the first position and the second mirror to oscillate a-second harmonic light of the first peak wavelength light as a first laser beam; and
   a second resonance optical system including:
      a third resonant mirror and the first resonant mirror placed with the laser medium, forming the second resonance optical system, and the movable mirror disposed in the second position interposed between the third resonant mirror and the first resonant mirror to resonate light of a second peak wavelength among the plurality of peak wavelengths emitted from the laser medium, the second position in which the second peak wavelength light being reflected by the movable mirror between the laser medium and the third mirror, the second peak wavelength being different in wavelength from the first peak wavelength; and
      a second wavelength converting element located between the third mirror and the movable mirror disposed in the second position to oscillate second harmonic light of the second peak wavelength light as a second laser beam.

2. The laser apparatus according to claim 1, wherein the movable mirror is movable in a direction of a resonance optical axis of the laser medium to be disposed changeably between the first and second positions.

3. The laser apparatus according to claim 1, wherein the movable mirror is rotatable about an axis perpendicular to a resonance optical axis of the laser medium to be disposed changeably between the first and second positions.

4. The laser apparatus according to claim 1, further including an output mirror arranged on the optical path between the laser medium and the movable mirror disposed in the first position or the second position, the output mirror having a property of reflecting the first peak wavelength light and the second peak wavelength light while transmitting the first laser beam and the second laser beam.

5. The laser apparatus according to claim 1, wherein the laser medium includes an Nd:YAG crystal.

6. The laser apparatus according to claim 1, wherein the first and second wavelength converting elements include nonlinear crystals.

7. The laser apparatus according to claim 1 is an ophthalmic laser treatment apparatus,
   wherein the first wavelength converting element has a property of converting the light of the first peak wavelength in a near-infrared region to the first laser beam of a wavelength in a visible region which is second harmonic light of the first peak wavelength light, and
   the second wavelength converting element has a property of converting the light of the second peak wavelength in the near-infrared region to the second laser beam of a wavelength in the visible region which is second harmonic light of the second peak wavelength light.

8. The laser apparatus according to claim 1, further including a sensor which detects a position where the movable mirror has been moved.

9. A laser apparatus for emitting laser beams of a plurality of different wavelengths, the apparatus including:
   an exciting light source;
   a solid-state laser medium which emits light of a plurality of peak wavelengths by the exciting light source;
   a movable reflection mirror disposed changeably between a first position and a second position;
   a first resonance optical system including:
      a first resonant mirror and a second resonant mirror placed with the laser medium, forming the first resonance optical system, and the movable mirror disposed in the first position interposed between the first resonant mirror and the second resonant mirror to resonate light of a first peak wavelength among the plurality of peak wavelengths emitted from the laser medium, the first position in which the first peak wavelength light being not reflected by the movable mirror by moving off the movable mirror from an optical path between the laser medium and the second mirror; and
      a first wavelength converting element located between the laser medium and the second mirror to oscillate a-second harmonic light of the first peak wavelength light as a first laser beam; and
   a second resonance optical system including:
      a third resonant mirror and the first resonant mirror placed with the laser medium, forming the second resonance optical system, and the movable mirror disposed in the second position interposed between the third resonant mirror and the first resonant mirror to resonate light of a second peak wavelength among the plurality of peak wavelengths emitted from the laser medium, the second position in which the second peak wavelength light being reflected by the movable mirror between the laser medium and the third mirror by moving the movable mirror onto the optical path, the second peak wavelength being different in wavelength from the first peak wavelength; and a second wavelength converting element located between the third mirror and the movable mirror disposed in the second position to oscillate second harmonic light of the second peak wavelength light as a second laser beam.

10. The laser apparatus according to claim 9, further including an output mirror arranged on the optical path between the laser medium and the movable mirror disposed in the second position, the output mirror having a property of reflecting the first peak wavelength light and the second peak wavelength light while transmitting the first laser beam and the second laser beam.

11. The laser apparatus according to claim 9, wherein the laser medium includes an Nd:YAG crystal.

12. The laser apparatus according to claim 9, wherein the first and second wavelength converting elements include nonlinear crystals.

13. The laser apparatus according to claim 9 includes an ophthalmic laser treatment apparatus, wherein the first wavelength converting element has a property of converting the light of the first peak wavelength in a near-infrared region to the first laser beam of a wavelength in a visible region which is second harmonic light of the first peak wavelength light, and the second wavelength converting element has a property of converting the light of the second peak wavelength in the near-infrared region to the second laser beam of a wavelength in the visible region which is second harmonic light of the second peak wavelength light.

* * * * *